Nov. 5, 1935.  W. S. DAMHORST  2,020,137
PROCESS OF COLORING BRICKS
Filed June 15, 1933
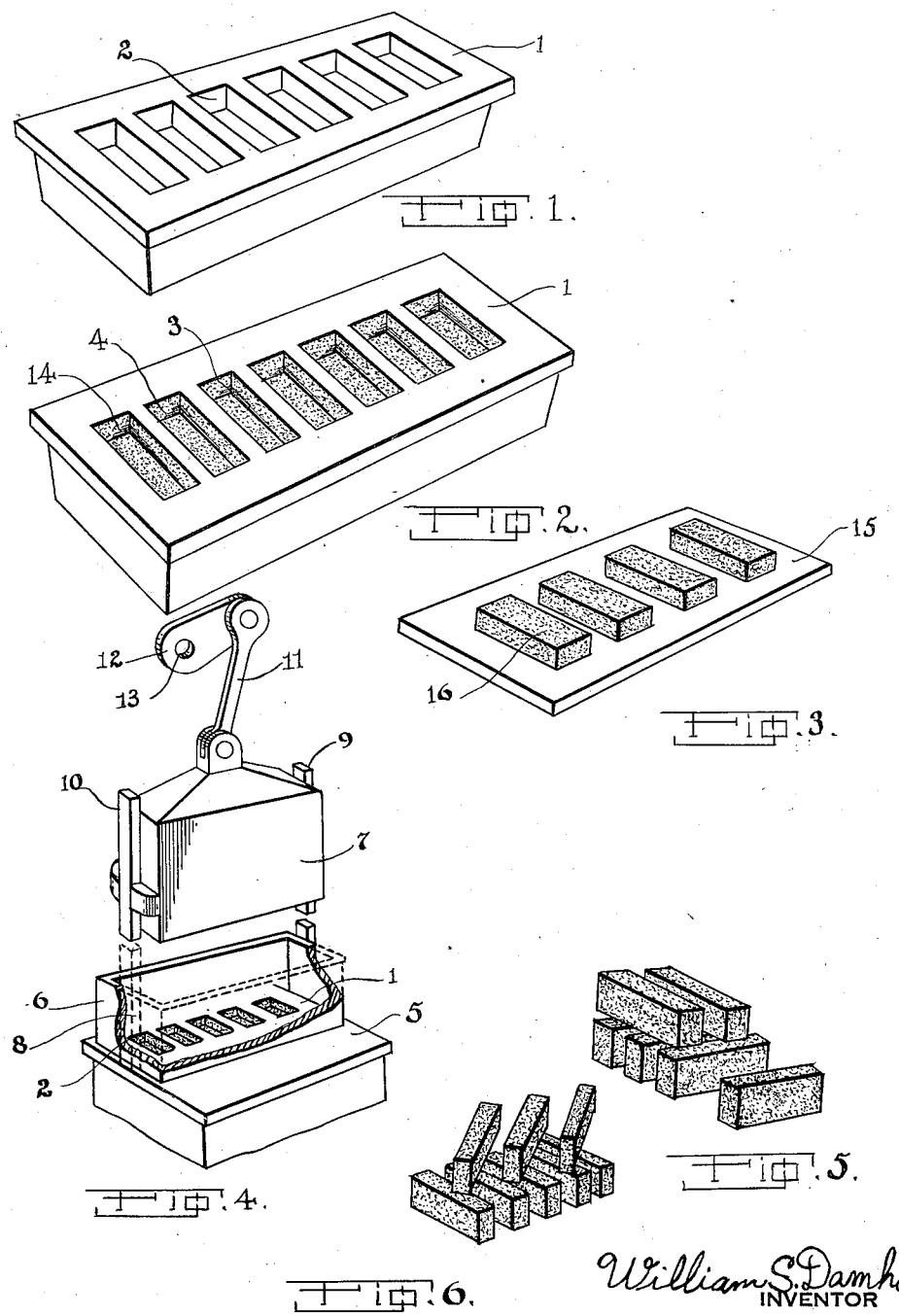
William S. Damhorst
INVENTOR
BY A. B. McCall
ATTORNEY Patented Nov. 5, 1935

2,020,137

UNITED STATES PATENT OFFICE 2,020,137

PROCESS OF COLORING BRICKS

William S. Damhorst, Quincy, Ill.

Application June 15, 1933, Serial No. 675,886

1 Claim. (Cl. 25—156)

My invention relates to methods of treating bricks, preferably for building purposes, and more especially to the means by which the bricks are colored, either for solid colors or for variations in color; an object being in my process to provide a convenient, economical, and practical method of coloring the faces and ends of bricks used for facing brick purposes in building construction.

A particular purpose of my process is to provide a very simple and practical method of applying the color chemicals and ingredients while the clay material is yet plastic in the moulds, commonly called sand moulds, that are used in connection with the soft mud process of moulding bricks, by which means it is possible to vary the colors not only by a variation in color mixtures applied to the plastic clay but also when burning the brick in a kiln to vary the color tones in any one face of the bricks by selectively stacking the bricks in the kiln in a manner after they are dried that will permit variations in surface exposure to fire during the burning process.

I attain the objects of my process in the manner described in the following specification with the aid of a drawing which illustrates certain steps in the methods of procedure in the application of my process of coloring bricks.

Referring to the figures:

Figure 1 is a perspective of one of the moulds used in connection with my process which is a multiple cavity mould commonly used in connection with the sand mould or soft mud process of moulding bricks.

Figure 2 is a perspective of the mould shown in Figure 1 but illustrating the way in which the cavity walls of the mould are covered with the mixture of fine sand and coloring chemicals after the mould is made wet so that this mixture will adhere to the inner walls thereof.

Figure 3 is a perspective illustrating a drying board with a group of bricks thereon in the position in which they are removed from the mould and showing the faces and ends of the bricks covered with the mixture of granulated sand and coloring chemicals pressed into the surface of the bricks.

Figure 4 is a perspective illustrating a portion of a conventional pressure die and mould used in connection with my process and commonly used in connection with the sand mould or soft mud process of moulding brick.

Figure 5 illustrates one of the arrangements used in the stacking of the bricks in the burning kiln.

Figure 6 illustrates a further desirable arrangement of the bricks in the kiln for the variation of brick face exposure to the fire during the burning process.

Referring now to the details of the various steps in my process of coloring brick I shall set forth in a clear and concise manner the preferred procedure pertaining to the essentials of my process, leaving minor and unimportant details subject to the changes may be required in local situations, yet falling within the scope of my invention.

In the order of their occurrence I shall now mention the successive operations in connection with my process of coloring brick:

I first mix the coloring chemicals, such as the manganese, or metallic red, or powdered zinc with a fine grade of sand, depending on the color tones desired, and where certain shades of gray may be desired a fire clay dust may be also mixed in with the other ingredients.

For instance, if a red brick face is desired, then metallic red is mixed with the fine grade of sand. If a small percentage of metallic red is used a lighter shade may be obtained, while the darker shades of brick face may be produced by using a greater percentage of manganese with variations possible running from a chocolate color to a black, depending on the variation in percentage of the manganese used with the metallic red. A green color brick facing is made by mixing powdered zinc with the sand and the variations in the shades of green may be secured by a variation in the temperature in the kiln during the burning process, while the mixture with the sand is the same.

Manganese will, when mixed with fire clay dust and sand, produce by this process a gray brick facing, with the shade of gray that may be desired varied by a variation in the percentage of manganese for the darker shades, while the fire clay dust in the color mixture tends to produce the lighter shades of gray coloring.

It will thus be observed that by my process of coloring brick facings that a great variety of color tones and color combinations may be burned into the brick, making it possible to produce more than one color tone on a brick facing or produce in any one kiln burning operation a great variety of bricks of different facing color by mixing the colors of different combinations together in the same mould.

Thus by this process it will be seen that a variation in colors may be obtained not only by the selected mixture of color ingredients with the sand in the different mould units, but also variations in tints of such colors may be produced by the placing of the bricks in the kiln in tiers one upon the other in selected relative positions.

By using my process of coloring brick facings in connection with the sand mould or soft mud process of moulding brick, it is possible thus to sand and color both faces and both ends of each brick making it more convenient for the bricklayer to handle the same when laying the brick by avoiding the necessity of turning the brick around to get the right face out.

Referring to the drawing in connection with important steps in my process, I prefer to use a multiple cavity mould known as a sand mould 1 provided with a plurality of cavities 2 for moulding the bricks in suitable size and form by pressing the plaster clay into the cavities.

Mould 1 is dipped or soaked in water preferably so that the inner walls 3 and ends 4 of cavities 2 will be well moist when the mold 1 is removed from the water. The sand and color mixtures are then applied to the wet walls of the cavities, either by dumping the cavities full of the mixture and then emptying them so as to leave a coating of the mixture adhering to the inner walls of these cavities.

The mould 1 is then placed upon the table or rack 5 of the mixer and die machine in connection with which a hopper 6 may be used for receiving the soft plastic clay when it is conducted to the mould 1 and holding the clay in place while a die 7 is forcefully pressed down upon the plastic clay 8, forcing the same into the mould cavities 2 which form the bricks in their size and shape.

It will be noted that the illustration in Figure 4 is only fanciful, merely to illustrate a structure that will explain the process wherein the die 7, for instance, may need guides 9 and 10, a lifting arm 11 or a crank 12 upon a rotating shaft 13 driven by belt or motor or cogs or other power transfer machines. In fact, the detail structure of the mixer and die are not essential to my process so long as the bricks are moulded in a mould by a pressure die.

When the pressure is applied then the sand and color mixture 14 is forced to stick to the contacting faces and ends of the plastic bricks, thus impregnating the faces and ends of the plastic clay with the sand and color mixture where it will remain throughout the drying and burning operations.

When the moulded plastic bricks are thus formed they are dumped upon a dryer pallet 15 as illustrated by bricks 16 in Figure 3. The plastic bricks are carried on these pallets until they are handled through the dryer or through the drying operation, after which they are removed and stacked within the kiln in tiers in which the individual bricks are stacked on edge in some such varied manner as is illustrated in Figures 5 and 6 merely to secure a suitable circulation of the fire in the kiln among the bricks and to provide a varied exposure of the brick facings to the fire with a variation in the color tones of the brick faces secured by the chemical action of the fire upon the brick surfaces exposed to the fire directly. The illustrations in Figures 5 and 6 merely show two possible ways of stacking the brick tiers for securing the variation in color tones to be produced by the burning process, and numerous other arrangements of the individual bricks and tiers may be made as desired or a solid color may be made by facing the bricks in the stacking operation.

In the brick kiln where the burning is done, the bricks are piled high and spaced carefully with whatever selected positions are used so that the heat will thoroughly circulate between the bricks during the entire burning operation.

Having thus described the nature of my invention, what I claim is:

The process of coloring bricks comprising mixing coloring chemicals such as manganese, metallic red, and powdered zinc, and fire clay dust, with a fine grade of sand, wetting the cavity walls of a brick-forming mould of the type used in connection with the sand mould process of making soft mould brick, covering said wet cavity walls of said mould with a relatively thin coat of said fine sand and color mixture by wetting the mould and applying said mixture to said cavity walls while the walls are wet and mixtures dry, forcing plastic clay into said mould cavity under heavy pressure forming bricks thereof and at the same time by said pressure thus forcing said coating of sand and color mixture from said cavity walls into the adjacent surfaces of the plastic brick, removing said plastic bricks to a drying pallet and to a dryer, drying the bricks, placing said dry bricks in a kiln in tiers and stacks in varied space relation and varied relative position to provide varied face surface exposures to fire to secure variations in face colorings and then burning said bricks in said kilns.

WILLIAM S. DAMHORST.